United States Patent [19]

Metroka et al.

[11] Patent Number: 5,175,759
[45] Date of Patent: Dec. 29, 1992

[54] COMMUNICATIONS DEVICE WITH MOVABLE ELEMENT CONTROL INTERFACE

[76] Inventors: Michael P. Metroka, 730 Oakview Dr., Algonquin, Ill. 60102; Robert K. Krolopp, 6466 Cape Cod Ct., Lisle, Ill. 60532

[21] Appl. No.: 439,983

[22] Filed: Nov. 20, 1989

[51] Int. Cl.⁵ ............................................. H04M 11/00
[52] U.S. Cl. ........................................ 379/58; 379/61; 379/63; 455/89; 381/43
[58] Field of Search ................... 379/58, 63, 433, 62, 379/67, 56, 61; 362/24; 364/707; 455/90, 89, 73; D14/138; 340/825.44, 825, 825.36; 371/66; 381/43, 40, 110, 41

[56] References Cited

U.S. PATENT DOCUMENTS

| | | | |
|---|---|---|---|
| D. 300,742 | 4/1989 | Soren et al. | D14/148 |
| D. 304,189 | 10/1989 | Nagele et al. | D14/147 |
| D. 305,427 | 1/1990 | Soren et al. | D14/138 |
| 3,476,886 | 11/1969 | Ferrari et al. | |
| 3,551,607 | 12/1970 | Tommasi et al. | |
| 3,962,571 | 6/1976 | Brantingham | 364/707 |
| 4,018,998 | 4/1977 | Wagner | 379/370 |
| 4,122,304 | 10/1978 | Mallien | 379/63 |
| 4,124,879 | 11/1978 | Schoemer | 362/24 |
| 4,471,493 | 9/1984 | Schober | 379/61 |
| 4,477,807 | 10/1984 | Nakajima et al. | 340/825.44 |
| 4,680,787 | 6/1987 | Marry | 379/63 |
| 4,737,975 | 4/1988 | Shafer | 379/58 |
| 4,797,929 | 1/1989 | Gerson et al. | 381/43 |
| 4,845,772 | 7/1989 | Metroka et al. | 379/61 |
| 4,870,686 | 9/1989 | Gerson et al. | 381/43 |
| 4,893,348 | 1/1990 | Andoh | 455/89 |
| 4,896,361 | 1/1990 | Gerson | 381/40 |
| 4,897,873 | 1/1990 | Beutler et al. | 379/433 |
| 4,933,963 | 6/1990 | Sato et al. | 379/58 |
| 4,945,570 | 7/1990 | Gerson | 381/110 |
| 4,959,850 | 9/1990 | Marui | 379/58 |
| 4,961,212 | 10/1990 | Marui et al. | 379/67 |
| 5,023,911 | 6/1991 | Gerson | 381/43 |
| 5,033,109 | 7/1991 | Kawano et al. | 455/90 |
| 5,048,117 | 9/1991 | Aisaka et al. | 455/89 |
| 5,054,115 | 10/1991 | Sawa et al. | 455/89 |

FOREIGN PATENT DOCUMENTS 9010340 9/1990 PCT Int'l Appl. .................. 379/58

OTHER PUBLICATIONS

Motorola, "V. S. P. Hands-Free Operation Board", 68P81048E93-A Jun. 15, 1983.
Motorola, "Dyna-Tac 6000X", 1984.
Systcoms "Systcoms Classic Series", Telephony Jan. 28, 1990.
Realistic Owner's Manual: Duofone ET-415 Cordless Electronic Telephone: Cat. #43-444: 1984.
Motorola, Inc., User's Manual #68P81121E820: Digital Voice Caller, Sep. 1988.
Motorola, Inc. Manual #68P81115E38-D "VSP Hands-Free Optics-Model T375A Series", Nov. 5, 1985.
Motorola, Inc. Manual #68P81117E63-O "VSP II Hands Free Option", Model No. T944 Series Nov. 8, 1965.
Panasonic KX-T300 Easa-Phone Cordless Phone FCC Transmitter Type Acceptance Filing Exhibits B, E, F Telecommunications Mar. 1990, Motorola Advertisement.
Motorola, "Digital Hands Free Adapter Accessory", 1990.
Motorola, "Digital Hands Free Adapter for Personal Telephones", 1989.

*Primary Examiner*—Curtis Kuntz
*Assistant Examiner*—William Cumming
*Attorney, Agent, or Firm*—Raymond A. Jenski; Rolland R. Hackbart

[57] ABSTRACT

A portable radiotelephone with a keypad, alphanumeric character display, and hands free function is disclosed. A movable flip element of the housing covers a keypad and other control buttons when in a closed, on-hook, position and activates the illumination of the keypad, enables the display, and enables the hands free function when in an open, off-hook, position. The duration of keypad illumination and display activation are timed to reduce battery drain and the hands free function may be deactivated with a hookswitch flash.

4 Claims, 8 Drawing Sheets

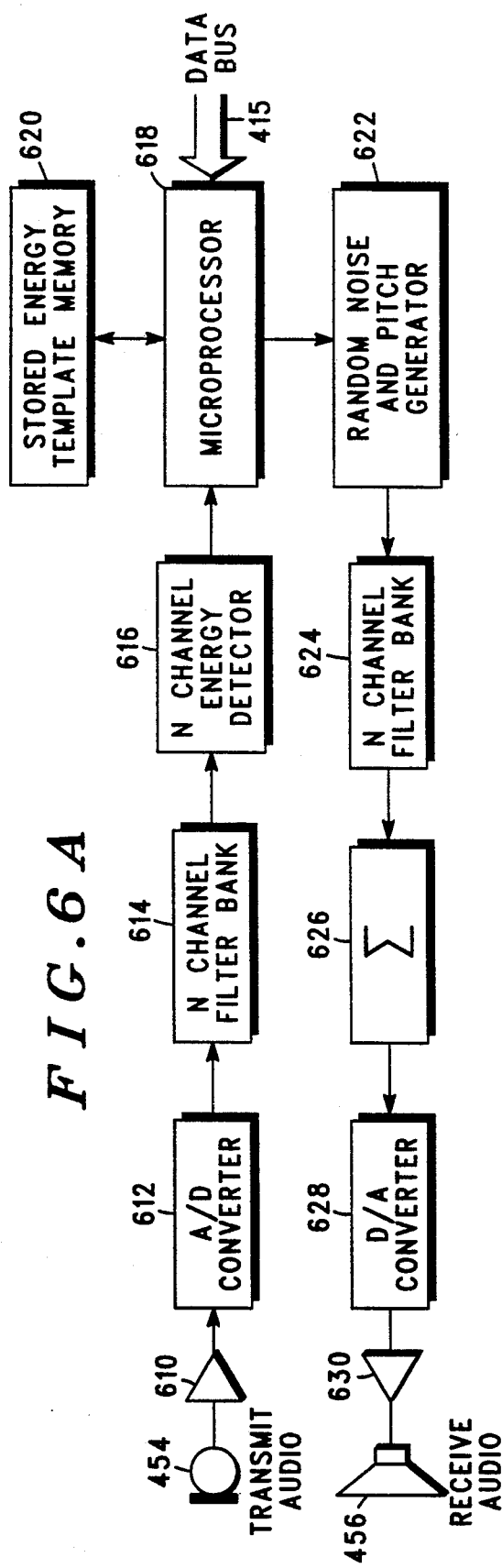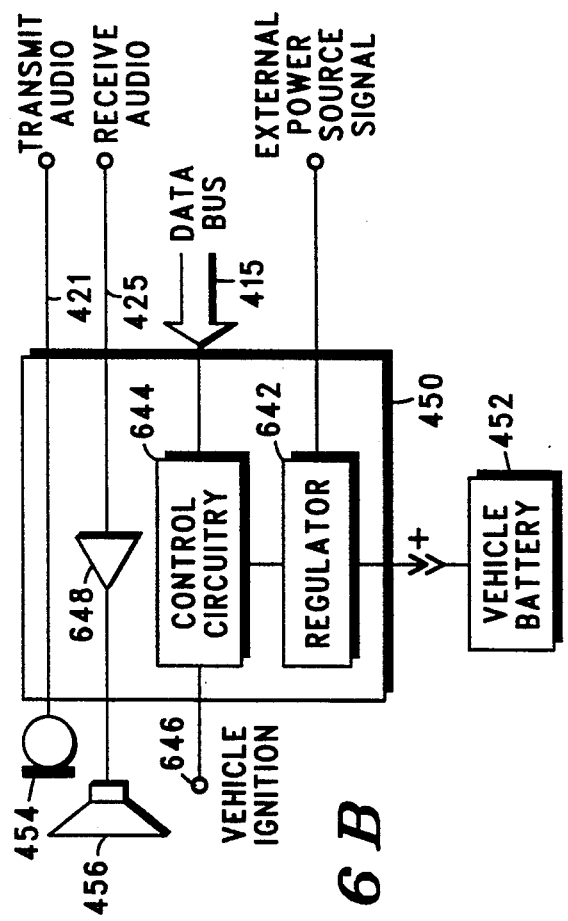

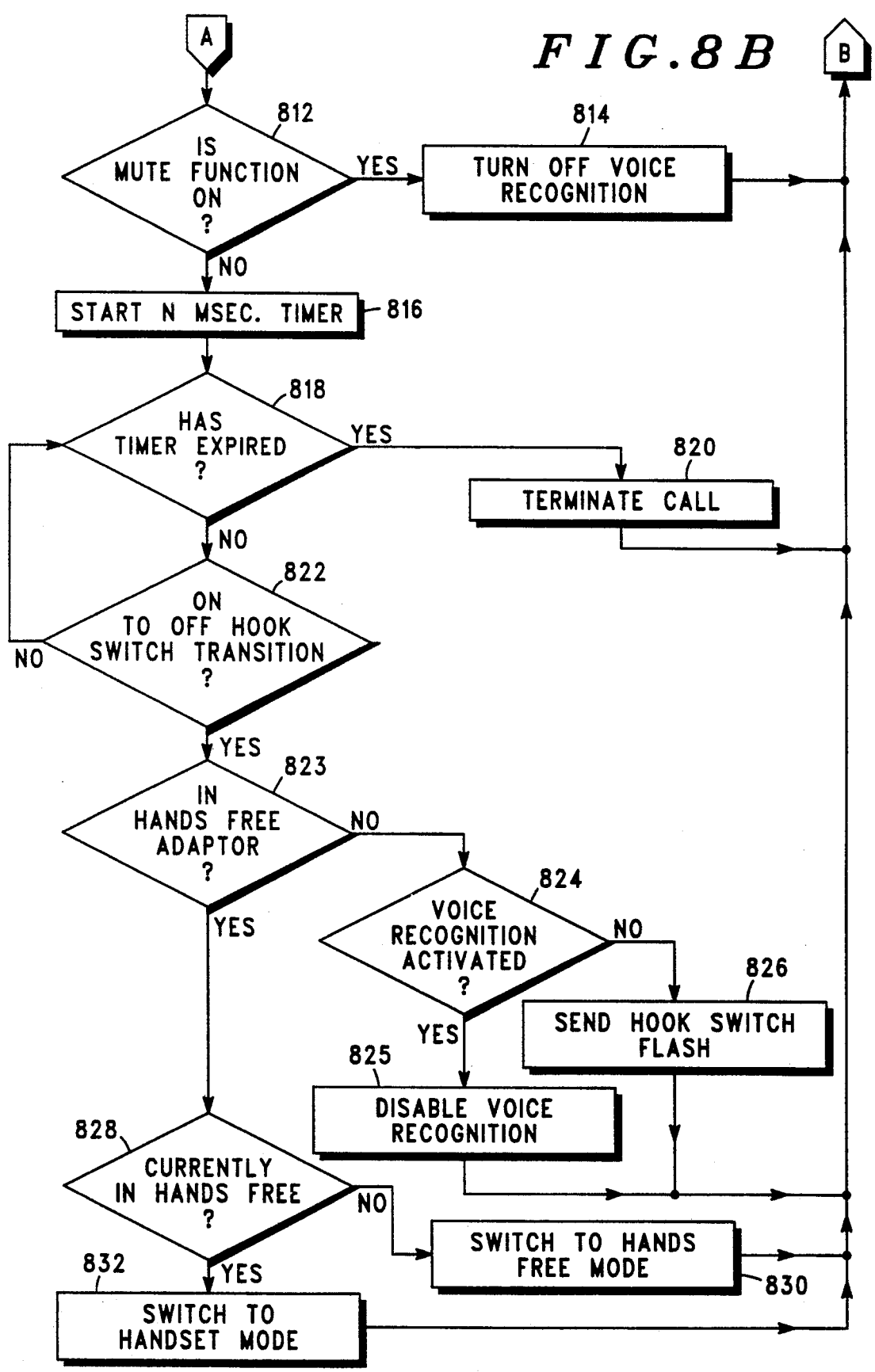

COMMUNICATIONS DEVICE WITH MOVABLE ELEMENT CONTROL INTERFACE

BACKGROUND OF THE INVENTION

The present invention is generally related to a portable telephone apparatus, and more particularly to a cellular portable radiotelephone utilizing a movable housing element to permit the user to answer and terminate telephone calls and control various radiotelephone functions by opening or closing the movable element. This invention is related to that disclosed and claimed in U.S. patent application Ser. No. 439,993 filed on Jun. 27, 1990 in behalf of Metroka, et al.

Telephones having a rotary or pushbutton dial mechanism and other buttons integral to the handset portion have become commonplace in landline subscriber telephone instruments. This integral arrangement offers the telephone user the convenience of bringing the user interface mechanism and control buttons close to the user.

Radiotelephone operation, such as that offered in cellular radiotelephone or in cordless telephone sets, provide a mobility to the telephone user which landline telephone does not provide. The absence of a cord and the small size of the portable radiotelephone unit enables the user to carry the unit essentially whereever the user goes. Recent innovations have enabled voice recognition circuitry to be used with portable radiotelephones in order to provide the user the ability to dial and control the operation of a portable radiotelephone with the spoken voice. Undesired operation of voice recognition circuitry in a radiotelephone setting, however, may turn the equipment on or off, cause transmission of unwanted signals and prevent use of a radio channel, or cause undesired functions to occur. Such undesired activation of voice recognition is likely to engage functions which reduce the operating life of the battery which powers the portable radiotelephone.

Additional drain upon the battery of the radiotelephone is made by the apparatus providing illumination for the dial keypad and number display. Previously, in order to activate the portable telephone's display, backlighting, or hands free function, the user would have to press a button which would initiate a function, digit, etc. The user would then have to press a clear button to delete this function or digit. Such an operation provides an unwanted opportunity for error and may, for example, have enabled the user to inadvertently erase the contents of the scratch pad memory used for dialing a call. A user, having experienced an undesired operation caused by an inappropriate press of a clear button, quickly becomes discouraged from using the otherwise useful illumination feature.

SUMMARY OF THE INVENTION

The present invention overcomes these problems by using the hookswitch in the movable flip element to activate the alphanumeric character display, backlighting, and hands free function.

Accordingly, it is one object of the present invention to provide a portable radiotelephone which utilizes a movable flip element to place the portable radiotelephone in an on-hook or an off-hook condition.

It is another object of the present invention to provide a portable radiotelephone, which utilizes a movable flip element to control the illumination of the keypad.

It is a further object of the present invention to provide a portable radiotelephone which utilizes a movable flip element to control the activation and deactivation of the hands free function.

It is a further object of the present invention to time the duration of the keypad illumination and display activation in order to conserve battery power.

BRIEF DESCRIPTION OF THE DRAWINGS

FIGS. 6A and 6B are block diagrams of the voice recognition circuitry and vehicular adaptor (hands-free) circuitry employed in the portable radiotelephone of FIG. 4.

FIGS. 8A and 8B are a flowchart depicting a process of interpreting hookswitch operation of the master microprocessor.

DETAILED DESCRIPTION OF THE PREFERRED EMBODIMENT

Figure 1:
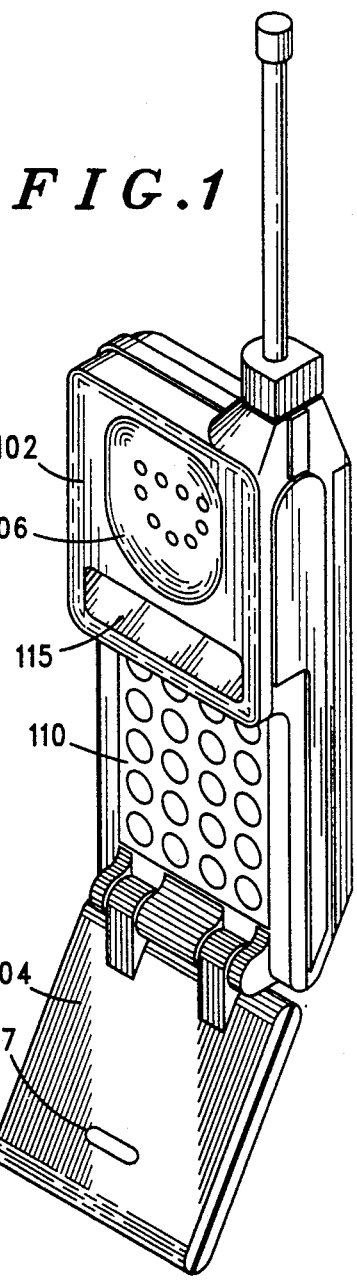
FIG. 1 is an isometric drawing of a portable radiotelephone which may employ the present invention.

A portable radiotelephone adapted to be used in a cellular radiotelephone system is shown in FIG. 1. This portable unit consists of two readily apparent portions, a body portion 102 and a flip element portion 104. The drawing of FIG. 1 shows the flip element portion 104. The drawing of FIG. 1 shows the flip element 104 in an "open" position such that a user of the portable unit may listen via earpiece 106 and may speak into the microphone 107. The dial or keypad 110 consists of a plurality of buttons numbered one through zero, #, and *, in a familiar telephone arrangement as well as additional function buttons such as "send", "end", "clear", "on-off", and other buttons associated with memory recall. Volume control buttons (not shown) may adjust the volume of the earpiece and/or the ringer. An alphanumeric display 115 is disposed above the keypad 110. Operation of such a portable radiotelephone and flip element has been described in U.S. Pat. No. 4,845,772, assigned to the assignee of the present invention.

When the flip element 104 is open as shown in FIG. 1, the portable cellular telephone can be in the state of answering or making a telephone call. Such a state is commonly known as "off-hook". (It should be noted that in a cellular preorigination dialing system an additional operator activity is required to place a call: upon entering a telephone number to be dialed either via the keypad 110 or by recognition of digits or names by a voice recognition circuit, the send button must be depressed in order to activate the portable unit's transmitter and to complete the call. In the preferred embodiment, the send button may also be electronically activated by the voice recognition circuit and can be used to answer a call if the flip element is already open). Upon completion of the telephone call, the user may hang up the portable telephone (go "on-hook") by moving the flip element 104 into a stowed position, that is, rotated about the axis of hinges 112 and 114 so that the flip element 104 rests nearly against keypad 110. This action activates a hookswitch (HKS) which causes the telephone call to be terminated. Depression of the end button or an equivalent operation by the voice recognition circuit without closing the flip element may also terminate the call.

Figure 2:
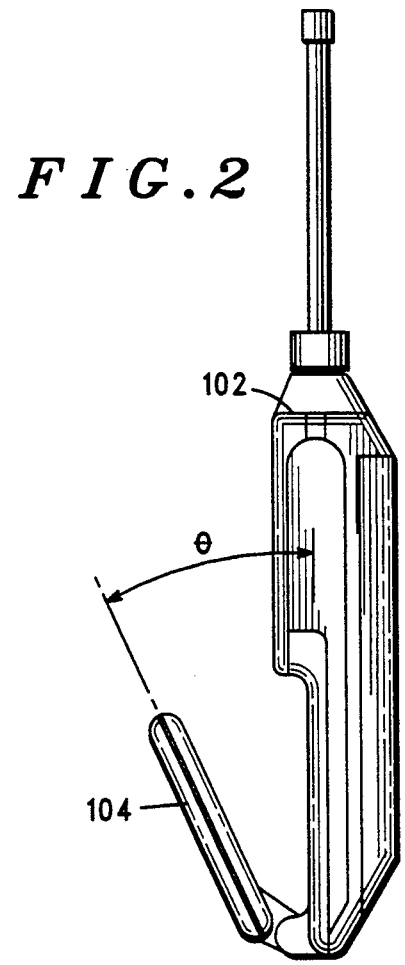
FIG. 2 is a side view of the portable radiotelephone of FIG. 1 depicting operation of the movable flip element.

Activation of the hookswitch occurs in the preferred embodiment when the angle between the body 102 and the flip element 104 equals approximately 45°. The closing of the flip element 104 can best be perceived in FIG. 2. The hookswitch in the preferred embodiment is located between the flip element 104 and the body portion 102 and may be seen in the detail of FIG. 3. A contact 302 consisting of a conventional conductive spring material is disposed in hinge 114 of flip element 104 and rotates with the flip element 104. A printed circuit board element 304 is disposed in the body portion 102 in a position such that the contact 302 presses against the circuit board element 304. Metallization disposed on printed circuit board element 304 is positioned such that when the flip element 104 is opened to an angle of 45°, an electrical connection is completed between the metallization through the contact 302 to ground. In the preferred embodiment, the combination of the contact 302 and the printed circuit board element 304 is the hookswitch (HKS) 306.

Figure 4:
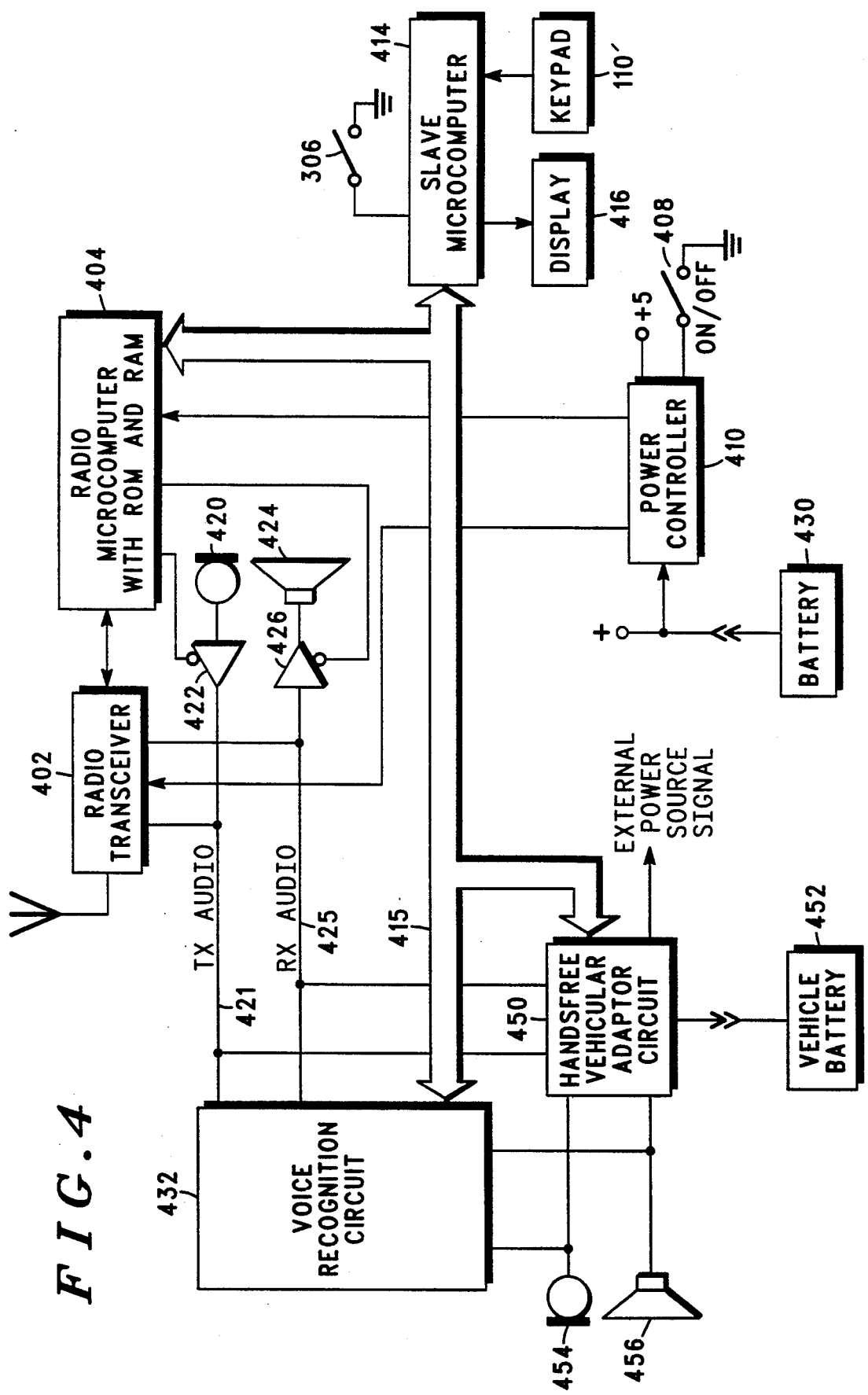
FIG. 4 is a block diagram of the electronic elements of a portable radiotelephone embodying the present invention.

Referring to FIG. 4, there is illustrated an electrical block diagram of a cellular portable radiotelephone embodying the present invention. Such a portable radiotelephone includes a cellular radiotelephone transceiver 402 operable in cellular radiotelephone systems, internal microphone 420 and switchable amplifier 422, internal speaker 424 and switchable amplifier 426, radio microcomputer 404 with conventional RAM (storing pertinent cellular telephone call parameters) and conventional ROM (storing control software), a power controller 410 including regulators coupled to battery 430 for generating DC voltages for powering other blocks and coupled to on/off switch 408, a slave microcomputer 414 including conventional ROM with control software for controlling display 416 and keypad 110', a voice recognition circuit 432, and a vehicular adaptor (hands-free) circuit 450. Radio microcomputer 404, slave microcomputer 414, voice recognition circuit 432, and vehicular adaptor (hands-free) circuit 450 are coupled to and communicate with one another by way of a three-wire data bus 415, which operates as described in U.S. Pat. Nos. 4,369,516 and 4,616,314 (incorporated herein by reference). The foregoing transceiver and microcomputer blocks may be conventional blocks of commercially available portable radiotelephones, such as, for example, the "MICROTAC PT" Cellular Telephone available from Motorola, Inc. The "MICROTAC PT" Cellular Telephone is described in further detail in operators manual no. 68P81150E49, published by and available from Motorola C & E Parts, 1313 East Algonquin Road, Schaumburg, Ill. 60196.

In the preferred embodiment, two interconnected microcomputer systems are utilized to control the basic functions of the portable radiotelephone (the radio microcomputer 404) and to control the keypad and display functions (the slave microcomputer 414). The slave microcomputer 414 is shown in more detail in the schematic of FIG. 5. The slave microcomputer 414 consists of a microprocessor 502 which, in the preferred embodiment, is an MC68HC05C4 microprocessor (which also has on-board memory). The basic function of the slave microprocessor is to provide interface to the user of the portable radiotelephone via keypad 110', display 416, and other buttons, indicators, and illumination backlighting. The slave microprocessor 502 is coupled to a multi-segment display 416 which, in the preferred embodiment, is a conventional LED eight digit display. The slave microprocessor 502 is also coupled to a keypad matrix of buttons 110' which enables the portable radiotelephone user to input (dial) telephone numbers, store and recall telephone number information, and perform other radiotelephone functions (such as initiate a telephone call). In the preferred embodiment, one of the keys 508 of the matrix 110' is specially dedicated to the function of turning the power on and off. Power on/off is accomplished by a momentary switch closure (by key 508) to ground which activates on/off circuitry. Volume increase switch 509 and volume decrease switch 511 are electrically coupled to the slave microprocessor 502 as part of the row/column matrix. Their physical location is away from the keypad 110' to allow for greater user convenience.

Figure 3:
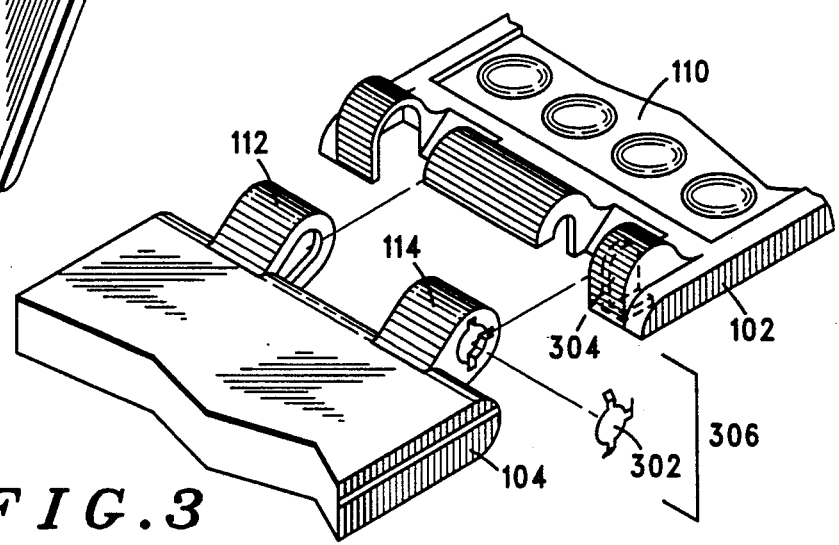
FIG. 3 is a diagram of the hookswitch switch mechanism which may be employed in the radiotelephone of FIG. 1.

The function which is normally performed by a hookswitch (HKS) in a conventional landline telephone is performed in the portable radiotelephone of the present invention as previously described in relation to FIG. 3. The hookswitch is shown schematically as switch 306 in FIG. 5. A DC (Direct Current) circuit is made or broken by HKS 306 to ground and applied to microprocessor 502. Furthermore, a pulse is generated from any change of state of the HKS 306 by a transistor 510 capacitors 512 and 514 and resistors 516, 518, and 519. The output of transistor 510 is taken from the collector and applied to the interrupt request (IRQ) input and the keypad column inputs of microprocessor 502 having a negative duration of approximately 10 microseconds. Microprocessor 502 stores the status of HKS 306 and provides an indication of the change of state of HKS 306 to the radio microprocessor 404.

Communication between the slave microprocessor 502 and the radio microprocessor 404 is maintained on a data bus 415. This data bus 415 is coupled to the radio microcomputer 404 as shown in FIG. 4. Other functions also share the data bus 415 including the voice recognition circuit 432 and the vehicular adaptor circuit 450.

Assuming that the portable radiotelephone has been powered-up and the flip element has been opened to enable the HKS, a keypad 110' pushbutton activation by the portable radiotelephone user results in a communication between the slave microprocessor 502 and the radio microcomputer 404 via the bus 415. The slave microprocessor 502, in the preferred embodiment, communicates that a closure has occurred between a particular row and a particular column corresponding to the key pressed by the user. The radio microcomputer 404 may then take the appropriate action, such as returning a digit instruction via bus 415 for the slave microprocessor 502 to cause the display 416 to illuminate or otherwise display a character. Thus, the slave microprocessor 502 is commanded by the radio microprocessor 404 or the user in order to complete an assignment.

Referring now to FIG. 6A, there is illustrated a block diagram of a voice recognition circuit 432 which may be utilized in the present invention. When the voice recognition circuits are activated, microphone audio from an external microphone 454 is coupled to amplifier 610 where the gain is increased to an appropriate input level for the A/D converter 612. The A/D converter 612 digitizes the amplified analog input signal from amplifier 610. The digitized signal from A/D converter 612 is fed to a filter bank 614 comprised of 'n' bandpass filters whose responses overlap at the 3dB response points. The output from each of the filter bank channels is fed to an 'n' channel energy detector 616 where the amplitude of the signal in each bandpass response is detected. The detected level from each energy detector, at 616, is fed to conventional microprocessor 618 for comparison with a stored energy template from memory 620. Upon successful correlation of the microphone input with the stored template, microprocessor 618 sends a command on the data bus 415 to the radio microprocessor 404. In this manner, a spoken command such as a telephone number to be dialed or a "send" or "end" command may be entered to control radiotelephone operation. Synthesized voice replies from the voice recognition circuits are initiated by microprocessor 618 by sending control signals to a random noise generator and pitch generator circuit 622. Signals from these generators are fed to an 'n' channel filter bank 624 which comprises 'n' narrow bandpass filters. The output of these filters are added together in a summer block 626 whose output is then fed to a D/A converter 628 where the digital signal is converted to an analog signal. This analog signal is amplified to an appropriate level with amplifier 630 and sent to the RX audio path 425 which is then sent to the external speaker 456 so that the user will hear the synthesized voice responses. The voice recognition circuits may be activated and deactivated by the radio microprocessor 404 by sending commands to the voice recognition microprocessor 618 over the data bus 415. Similar voice recognition circuits are further disclosed in U.S. Pat. Nos. 4,797,929; 4,817,157; and 4,870,686, U.S. patent application Ser. Nos. 266,293 ("Word Spotting in a Speech Recognition System Without Predetermined Endpoint Detection" filed on behalf of Gerson on Oct. 31, 1988) now U.S. Pat. Nos. 5,023,911, 294,098 ("Digital Speech Coder Having Improved Vector Excitation Source" filed on behalf of Gerson on Jan. 6, 1989) now U.S. Pat. Nos. 4,896,361, and 399,341 ("Method for Terminating a Telephone Call by Voice Command" filed on behalf of Gerson et al. on Aug. 25, 1989) now U.S. Pat. No. 4,945,570 and International Publication Nos. WO/87/07748 and WO 87/07749 Dec. 17, 1987).

Referring to FIG. 6B there is shown a block diagram of a hands-free vehicular adaptor circuit which may be employed in the present invention. The hands-free vehicular adaptor 450 may be a hands-free adaptor with regulated power supply which couples the portable radiotelephone to a vehicle battery 452. When coupled to duplex hands-free adaptor (DHFA), the portable radiotelephone is in the DHFA mode, in which, inter alia, display 416 is not disabled when the portable radiotelephone is inactive for a predetermined time.

Radio microcomputer 404 detects the presence of an external power source by monitoring an external power source signal from hands-free vehicular adaptor circuit 450. The external power source signal is converted to a binary signal having a binary state indicating whether or not the external power source is present (i.e., binary zero state=external power source present).

If portable telephone is in the DHFA mode, audio amplifiers 422 and 426 are disabled and the transmitter (TX) audio 421 and receiver (RX) audio 425 are routed to the handsfree circuitry of the handsfree vehicular adaptor circuit 450 for processing and coupling to the hands-free microphone 454 and speaker 456, respectively, as shown in FIG. 6B.

The portable cellular radiotelephone receives its power via the external power source connection which is the output of conventional voltage regulator 642. The voltage supplied by vehicle battery 452 is voltage regulated and controlled by voltage regulator 642. Control circuitry 644 turns the regulator output on and off in response to signals from the vehicle ignition input at port 646 and data bus 415. Data bus 415 is used by the portable radiotelephone to sense if a hands-free adaptor 450 is plugged into the portable radiotelephone. Receiver audio signal 425 from the portable radiotelephone is coupled to amplifier 648 in hands-free adaptor 450 to boost the level to drive speaker 456. The output from microphone 454 is connected to the portable radiotelephone via TX audio connection 421.

Figure 5:
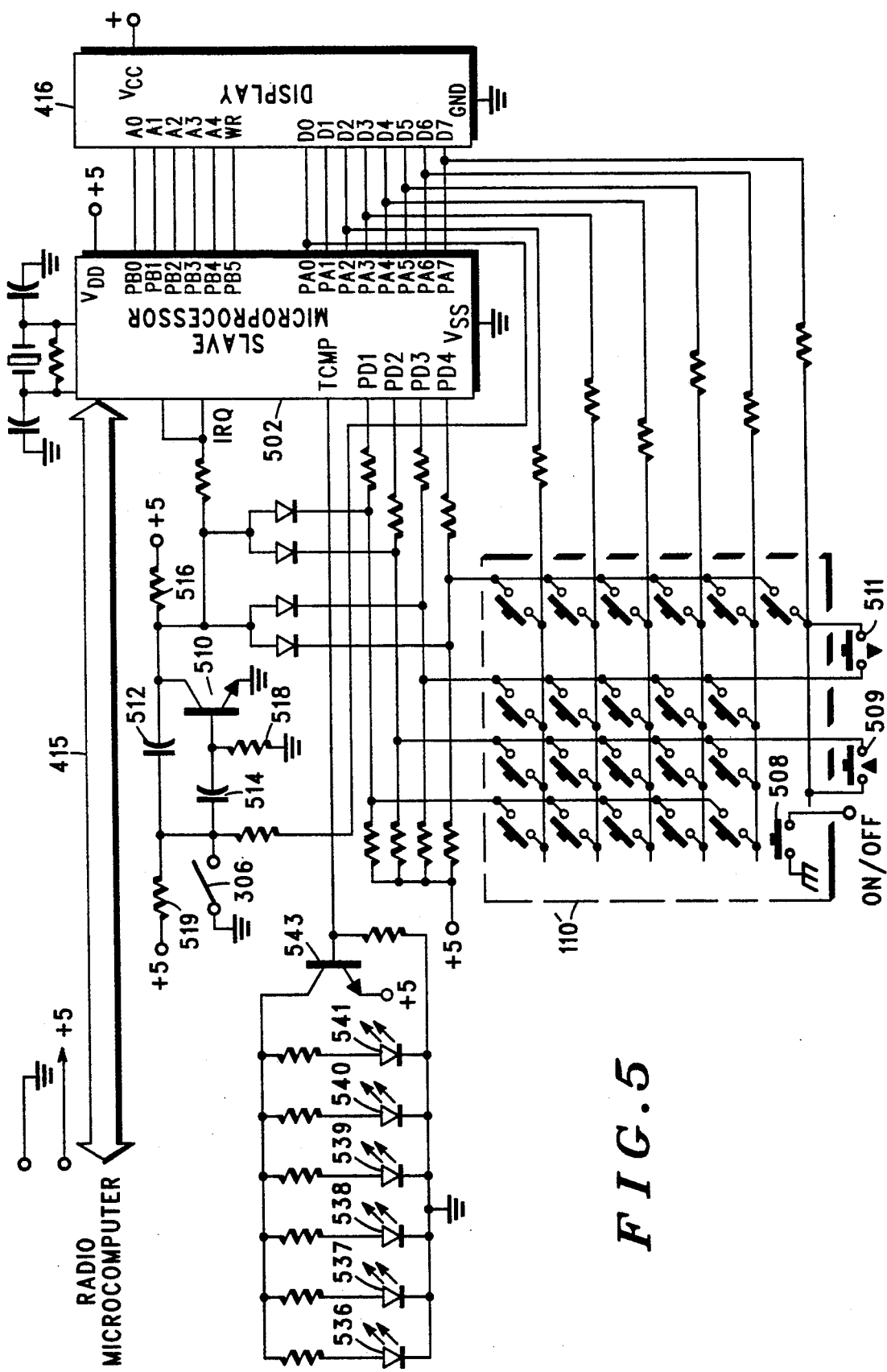
FIG. 5 is a schematic diagram of the slave microcomputer and associated circuitry employed in the portable radiotelephone of FIG. 4.

Illumination for the keypad 110 is provided, in the preferred embodiment, by a plurality of light emitting diodes (LEDs) indicated by diodes 536-541 in FIG. 5. LEDs 536-541 are conventionally supplied from battery+via current limiting resistors and switch transistor 543. Switch transistor 543 is coupled to the TCMP port of slave microprocessor 502 and is enabled/disabled in accordance with the stored program of slave microprocessor 502. The LEDs are physically mounted behind the keypad 110 shown in FIG. 1 and provide a backlighting to the keys to aid the user in selecting keys in dim lighting conditions.

Although the preferred embodiment has been implemented employing two microprocessors, this should not be a limitation of the invention for it is possible to implement the present invention in a single microprocessor should the designer so desire. For either a single microprocessor or a multiple microprocessor system, the microprocessors may be interrupt driven in order to save battery power.

Figure 7A:
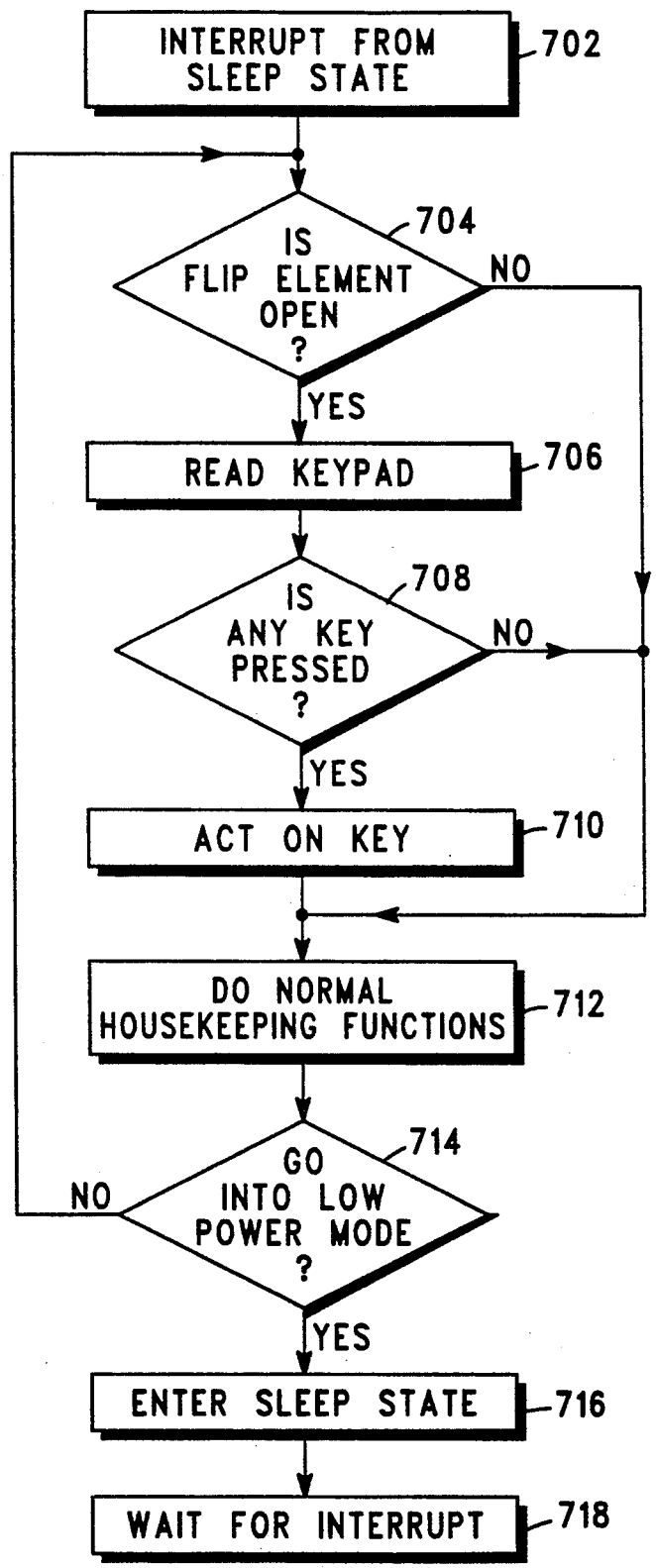
FIGS. 7A and 7B are a flowchart depicting the process of hookswitch operation of the slave microprocessor.
Figure 7B:
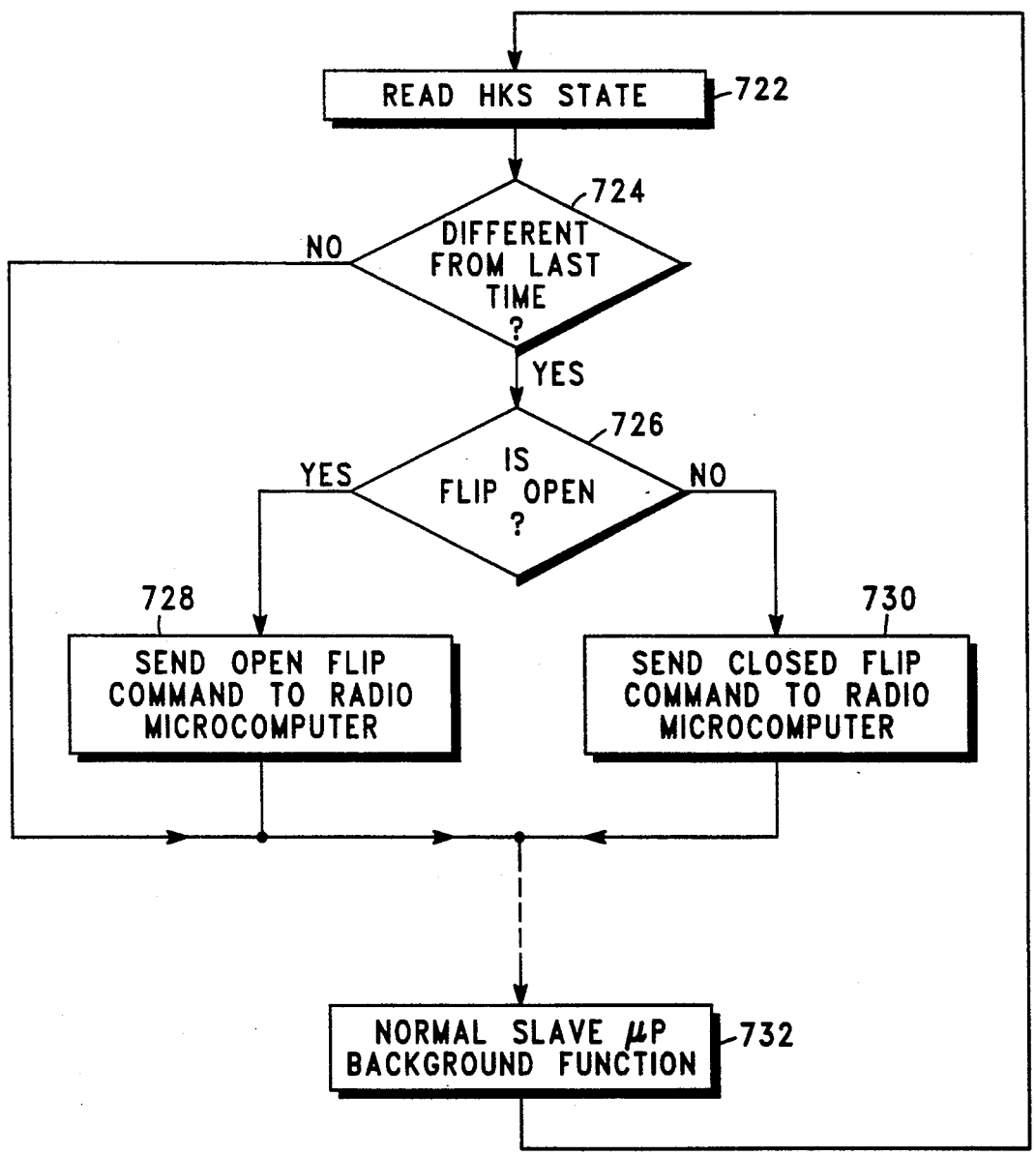

Referring now to FIGS. 7A and 7B, processes followed by the slave microcomputer 502 in realizing the present invention are illustrated in flowchart form. The process of FIG. 7A, therefore, commences with an interrupt due to a change of state of the hookswitch 306 to enable the microcomputer system at 702. A determination is made, at 704, whether the flip element is open or closed. If the flip element is open, then the keypad 110 is read to determine which key has been closed at 706. If a key has been depressed, at 708, then the function or character designated by the key is acted upon at 710. If a keypad 110 key has not been depressed, then no action is taken and the microcomputer system resumes its normal functions of controlling the transceiver, the display, and other housekeeping chores as shown at 712. If it is determined that the flip element is not open (at 704), then any keypad key depression is considered to be spurious and is ignored by progressing directly from the determination block at 704 to the normal housekeeping functions block at 712. The entire process is repeated for a predetermined period of time until a determination is made that the microcomputer system should go into a low power consumption mode as determined at 714. The microcomputer system is put into a "sleep" state at 716 and only the low power functions await for an interrupt signal at 718.

If the microcomputer system is implemented as a radio microcomputer and a slave microcomputer, the slave microprocessor 502 can send either a flip element closed indication or a flip open indication to the radio microcomputer, a detection of those indications is necessary by the radio microcomputer. The slave microprocessor 502 determines, as part of its routine of chores, whether the hookswitch has changed state by comparing the current state against the stored state 722 and 724 of FIG. 7B. If the state is different, then a determination is made, at 726, whether the flip element is open or closed. If the flip element is determined to be open, then an open flip element command is transmitted to the radio microcomputer at 728. If the determination at 726 yields a closed flip element, then a closed flip element command is conveyed to the radio microcomputer at 730 and the slave microprocessor returns to its normal background functions at 732. In either case the radio microcomputer 404 maintains the flip element state in its associated storage and the slave microprocessor 502, as part of its routine of chores, checks for a keypad enable or a keypad disable command received from the radio microcomputer 404. Thus, if the flip element is determined to be open, then the keys of the keypad are read in conventional fashion. If the flip element is determined to be closed, then the keys of the keypad are ignored.

Figure 8A:
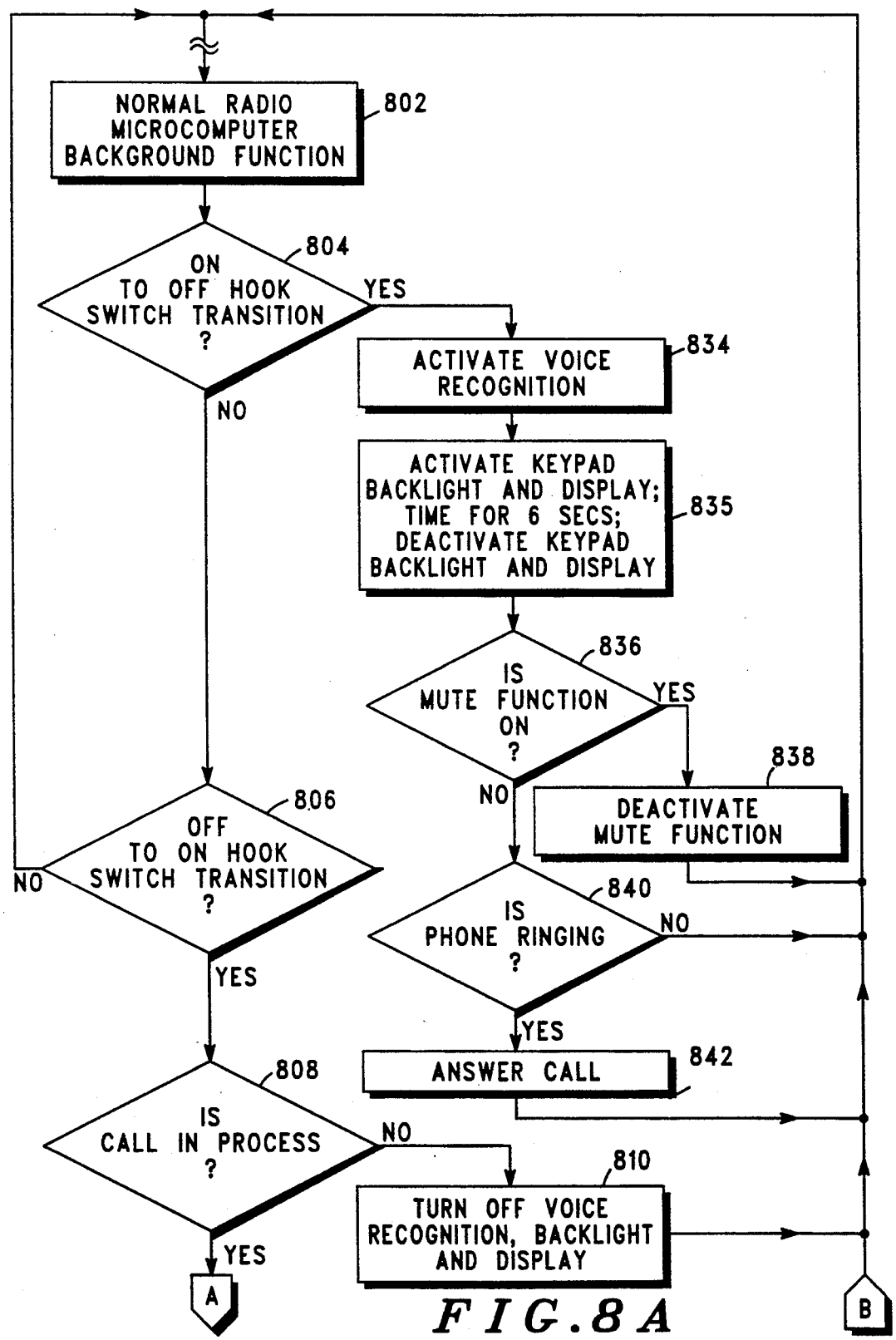

The process followed by the radio microcomputer 404 in realizing the present invention in the preferred embodiment is shown in FIGS. 8A and 8B. The radio microprocessor 404, as part of its routine of chores, at 802, checks for a on-hook to off-hook transition at 804. If an on-hook to off-hook transition has not occurred then flow proceeds to determination block 806 where a test is made to determine if an off-hook to on-hook transition has occurred. If none has occurred, then flow returns to the normal background functions at 802. If it is determined that an off-hook to on-hook transition has occurred at 806 indicating that the movable element 104 is in the closed position, then flow proceeds to determination block 808 where a test is made to determine if a telephone call is presently in progress. If it is determined that a call is not presently in progress, then flow proceeds to 810 where the voice recognition circuitry is disabled, the backlighting is inactivated, and the display is inactivated. Thus, if the movable flip element 104 is closed while a call is not in progress, then the voice recognition circuitry, the backlighting, and the display are inactivated. Optionally, the display may remain activated for a period of six seconds before being deactivated by such a off-hook to on-hook transition. From 810, flow returns to the normal background functions at 802. If a determination is made that a call was in progress, at 808, then flow proceeds to determination block 812. A test is made, at 812, of whether the microphone mute function is on. If the microphone is muted, then flow proceeds to 814 where the voice recognition circuitry is disabled. Thus, when the movable element 104 is closed while a call is in progress and the microphone is muted, the voice recognition circuitry is disabled. Flow proceeds from block 814 to 802 where flow returns to the normal background functions. If it is determined, at 812, that the microphone is not muted, then flow proceeds to block 816 where a timer of 'n' milliseconds is started. This timer runs until it has either expired or the movable flip element is reopened. After the counter is started, flow proceeds to determination block 818 where a test is made to determine whether the timer has expired. If the timer has expired then the flow proceeds to block 820 where the telephone call is terminated. Thus, if the movable element is closed for longer than 'n' milliseconds while a call is in progress and the microphone is not muted, then the call is terminated. In the preferred embodiment, the timer duration 'n' is 1000 milliseconds. Flow proceeds from block 820 to 802 where flow returns to the normal background functions. If it is determined, at 818, that the timer has not expired, then flow proceeds to determination block 822 where a test is made of whether an on-hook to off-hook transition has occurred. If no on-hook to off-hook transition has occurred, then flow returns to determination block 818. Flow continues in the 818-822 loop until either the timer expires or an on-hook to off-hook transition occurs. If a determination is made, at 822, that an on-hook to off-hook transition has occurred prior to the timer expiring, then flow proceeds to determination block 823. A test is made, at 823, of whether the telephone is coupled to the hands-free vehicular adaptor circuit 450. One such vehicular adaptor circuit which may be employed by the present invention is a S1757A available from Motorola, Inc., If the telephone is not coupled to the vehicular adaptor 450 then flow proceeds to a decision block, 824, where a determination of whether the voice recognition circuit has been enabled. If the voice recognition circuit has been enabled, it is then disabled, at block 825, before the process returns to the normal background functions at 802. If the voice recognition circuit is not enabled at this time, then the process proceeds to block 826 where a hookswitch flash signal is sent. Thus if the portable radiotelephone is coupled to the hands free vehicular adaptor 450 and is engaged in a telephone call when the hands free circuit of the vehicular adaptor is enabled, the momentary closure and reopening of the movable flip element (in less than "n" msec.) deactivates the hands free function and the portable radiotelephone reverts to the use of the internal microphone and speaker. Likewise, if the portable radiotelephone is coupled to the hands free adapter 450 and engaged in a telephone call with the hands free circuit disabled, the momentary closure and reopening of the movable flip element results in the activation of the hands free circuit. If the portable radiotelephone is not coupled to the hands-free vehicular adaptor 450 and is presently in a call with the microphone not muted where the movable element is momentarily closed and then reopened prior to the timer expiring, then either the voice recognition circuit is disabled or a hookswitch flash signal is sent. From 826, flow returns to the normal background functions at 802.

If a determination is made, at 823, that the telephone was in the hands-free vehicular adaptor, then the process flow continues to determination block 828. A test is made, at 828, to determine whether the telephone is currently in the hands free "speakerphone"mode. If it is determined, at 828, that the telephone is not in the hands-free "speakerphone" mode, then the process flow proceeds to block 830 where the mode is set to the hands-free mode. In the hands-free mode, the internal microphone 420 and speaker 424 are inactivated and the external microphone 454 and external speaker 456 are active. Thus, if the portable radiotelephone is in the hands-free vehicle adaptor 450 and is presently in a call with the microphone not muted while the movable element is momentarily closed and then re-opened prior to the timer expiring but is not in the hands-free mode at the time, then the mode is changed from a private call with the radiotelephone's internal microphone and speaker to the hands-free speakerphone mode using the external microphone and speaker.-From 830, flow returns to the normal background functions at 802. If it is determined, at 828, that the portable radiotelephone was in the hands-free speakerphone mode then the flow proceeds to block 832 where the mode is changed from the hands-free "speakerphone" mode to a private call using the radiotelephone's internal microphone and speaker. Thus if the portable radiotelephone is in the hands-free vehicular adaptor 450 and is presently in a call with either microphone not muted while the movable flip element 104 is momentarily closed and then reopened prior to the timer expiring and the radiotelephone is in the hands-free mode at the time, then the mode is changed from the hands-free "speakerphone" mode to that of a private call using the radiotelephone's internal microphone 420 and speaker 424. From 832, flow returns to the normal background functions at 802.

If it is determined, at 804, that an on-hook to off-hook transition occurred then the flow proceeds to block 834 where the voice recognition circuitry 432 is activated. The process then, at 835, activates the keypad backlighting illumination and the display 416 for a conventionally timed period of six seconds. Thus, if the radio microcomputer 404 is performing normal background functions and an on-hook to off-hook transition occurs, then the voice recognition circuitry is activated, the keypad backlighting is activated, the display is activated. The flow continues to determination block 836. A test is made, at 836, to determine whether the microphone mute function is on. If it is determined, at 836, that the microphone is muted, then flow proceeds to block 838 where the microphone is unmuted. Thus if the microphone is in the muted state with the movable element 104 closed, opening the movable element 104 will unmute the microphone, from 838 flow returns to the normal background functions at 802.

If it is determined, at 836, that the microphone was not muted, then flow proceeds to determination block 840. A test is made, at 840, to determine whether the portable radiotelephone is currently ringing. If it is determined, at 840, that the portable radiotelephone is not ringing, indicating that there is no incoming call, then the process flow returns to the normal background functions at 802. If it is determined, at 840, that the radiotelephone is ringing, then the process flow proceeds to block 842 where the incoming call is answered. Thus, if the portable radiotelephone is ringing while the movable flip element 104 is closed and the movable flip element 104 is opened, the incoming call is answered. From 842, flow returns to the normal background functions at 802.

Thus, a portable radiotelephone having the capability of enabling and disabling hands free circuitry and enabling and disabling number display and keypad illumination in response to the position of a flip element has been shown and described. A flip element which covers a keypad and other control buttons when in a closed position also activates a hookswitch. While a particular embodiment of the invention has been shown and described, it is to be understood that the invention is not to be taken as limited to the specific embodiment herein, and that changes and modifications may be made without departing from the true spirit of the invention. It is contemplated therefore to cover the present invention, and any and all such changes and modifications, by the appended claims.

We claim:

1. A radiotelephone apparatus having a portable unit with a movable housing element having an extended position and a contracted position, and a decouplable hands free apparatus, the radiotelephone apparatus comprising:
   means for producing an off-hook signal in the portable unit when the movable housing element is placed in the extended position and for producing an on-hook signal in the portable unit when the movable housing element has been placed in the contracted position;
   first means for detecting an occurrence of said on-hook signal and a subsequent off-hook signal within a predetermined period of time;
   second means for detecting a coupling of the decouplable hands free apparatus to the portable unit; and
   means, responsive to said first means for detecting and said second means for detecting, for activating the decouplable hands free apparatus.

2. A radiotelephone apparatus in accordance with claim 1 further comprising means for deactivating an activated decouplable hands free apparatus when said first means for detecting detects a second occurrence of said on-hook signal and a subsequent off-hook signal within a predetermined period of time.

3. A method of control of a decouplable hands free apparatus in a radiotelephone apparatus including a portable unit with a movable housing element having an extended position and a contracted position, the method comprising the steps of:
   producing an off-hook signal in the portable unit when the movable housing element is placed in the extended position;
   producing an on-hook signal in the portable unit when the movable housing element has been placed in the contracted position;
   detecting an occurrence of said on-hook signal and a subsequent off-hook signal within a predetermined period of time;
   detecting a coupling of the decouplable hands free apparatus to the portable unit; and
   activating the decouplable hands free apparatus in response to said detection of said on-hook signal and subsequent off-hook signal within a predetermined period of time and said detection of the coupling of the decouplable hands free apparatus to the portable unit.

4. A method in accordance with claim 3 further comprising the step of deactivating an activated decouplable hands free apparatus in response to detection of a second occurrence of said on-hook signal and a subsequent off-hook signal within a predetermined period of time.

* * * * *